(12) United States Patent
Petersson

(10) Patent No.: US 6,463,715 B1
(45) Date of Patent: Oct. 15, 2002

(54) ROTARY CLOSURE APPLICATOR

(75) Inventor: Goran Petersson, Staffanstorp (SE)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 09/976,705

(22) Filed: Oct. 12, 2001

(51) Int. Cl.$^7$ ............................................... B65B 16/16
(52) U.S. Cl. ....................................... 53/133.2; 53/565
(58) Field of Search ............................... 53/133.2, 202, 53/565; 493/87, 102, 184

(56) References Cited

U.S. PATENT DOCUMENTS

| | | |
|---|---|---|
| 5,110,041 A | 5/1992 | Keeler |
| 5,304,265 A | 4/1994 | Keeler |
| 5,366,433 A | 11/1994 | McCormick |
| 5,484,374 A | 1/1996 | Bachner et al. |
| 5,759,143 A | 6/1998 | Blain et al. |
| 5,819,504 A | 10/1998 | Giacomelli et al. |
| 5,964,687 A | 10/1999 | Rogalski et al. |
| 5,983,599 A | 11/1999 | Krueger |
| 6,066,081 A | 5/2000 | Bachner |
| 6,079,185 A | 6/2000 | Palaniappan et al. |

Primary Examiner—Scott A. Smith
Assistant Examiner—Nathaniel Chukwurah
(74) Attorney, Agent, or Firm—Welsh & Katz, Ltd.

(57) ABSTRACT

A rotary closure applicator applies two closures contemporaneously to two respective cartons on a form, fill and seal packaging machine. The closures are applied into openings and secured to the respective cartons. The applicator includes a body, a rotating shaft having a first longitudinally stationary section and a second longitudinally movable section. The first and second shaft sections are rotatable with one another independent of longitudinal movement of the movable section. A drive is operably connected to one of the shaft sections for rotating the shaft. A spoked applicator member is operably connected to the longitudinally movable section for moving the applicator member toward and away from the cartons. The applicator includes at least four closure supporting elements mounted thereto for supporting closures for movement into engagement with their respective cartons. Longitudinally movable sealing members are movable into and out of engagement with the cartons with the closures positioned in the carton openings for sealing the closures to the cartons.

16 Claims, 4 Drawing Sheets

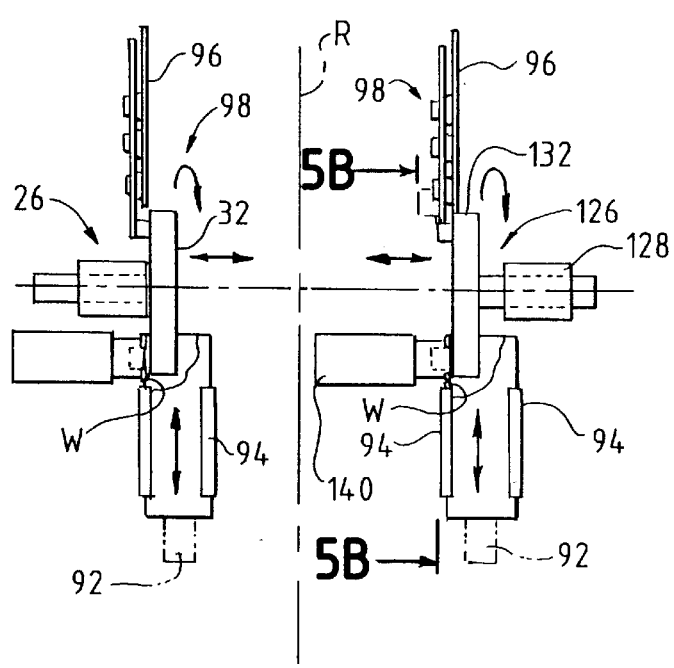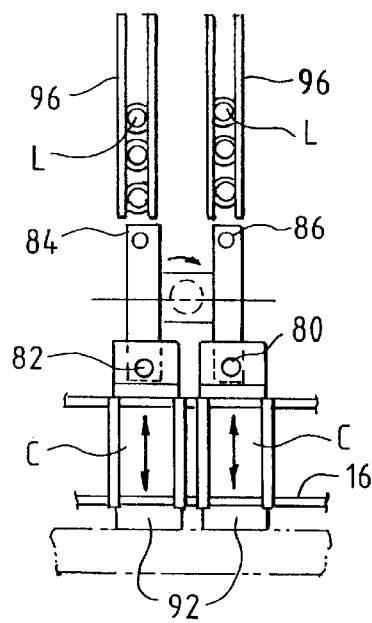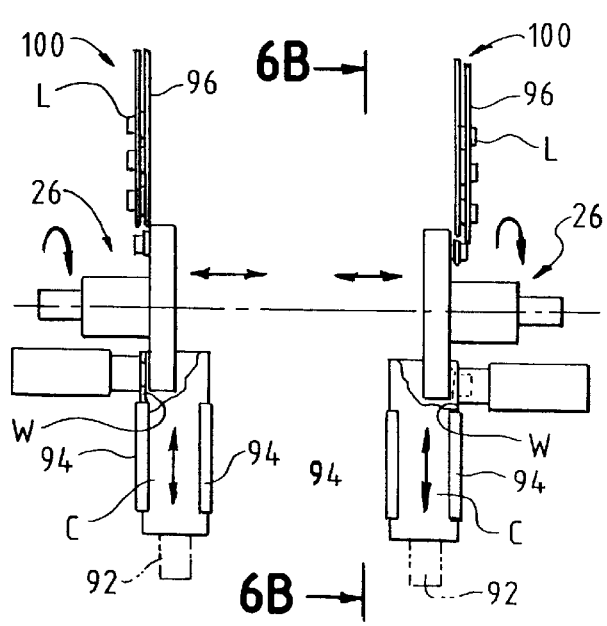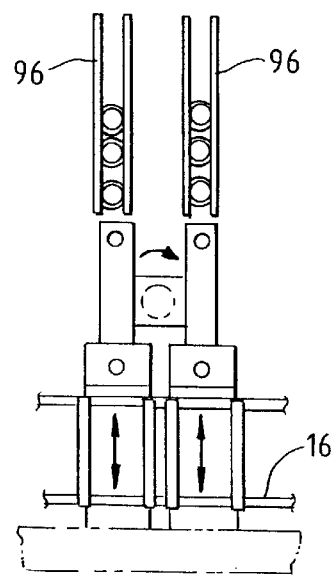

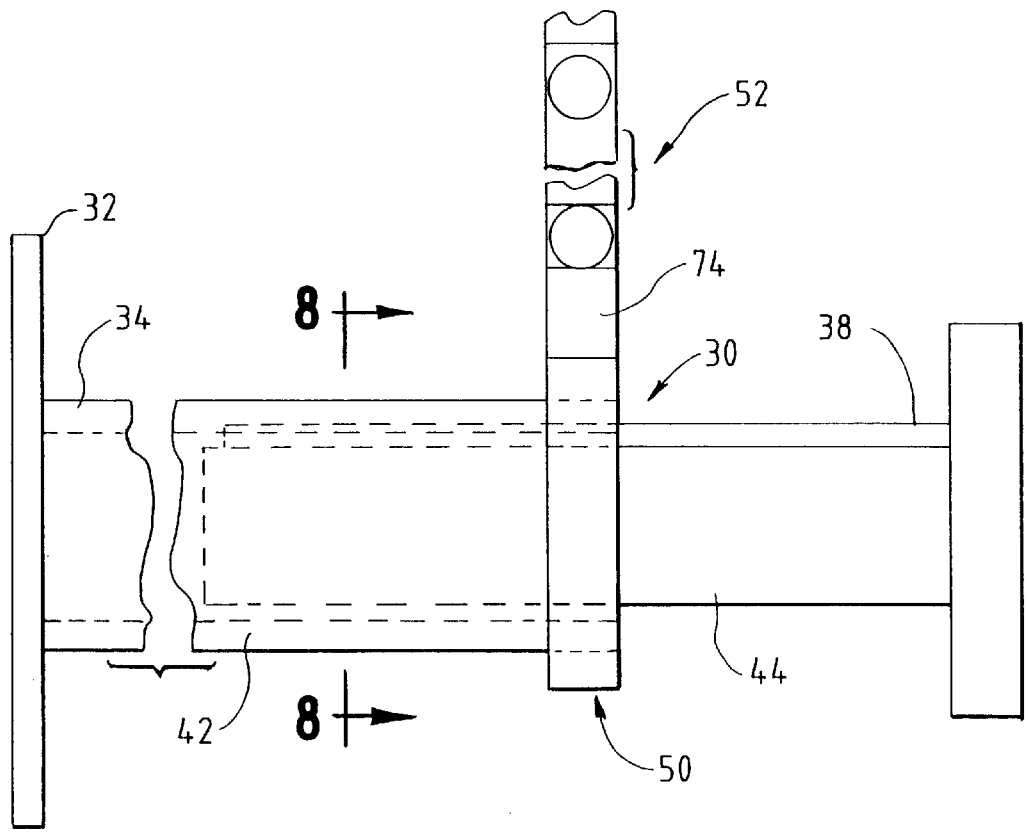
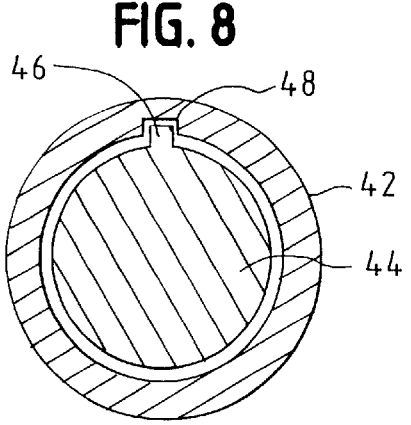

ROTARY CLOSURE APPLICATOR

BACKGROUND OF THE INVENTION

The present invention pertains to an applicator for attaching closures to cartons. More particularly, the present invention relates to a rotary applicator for attaching closures to cartons having pre-punched holes therein for receiving the closures.

Closure applicators are well-known in the art. Typically, these applicators are used to attach closures (e.g., a spout and cap package) to a carton. Generally, the cartons have pre-punched holes or openings therein that are configured to receive the closure.

Experience has taught that it is preferred to attached closure packages to the cartons from the inside. That is, the closure is attached with a flange thereof abutting or against an inside surface of the carton. The closure is then sealed to the carton by, for example, ultrasonic welding, a hot melt adhesive or like methods. In this manner, the joint or seal area between the closure and the container can be maintained in a sterile environment; that is, the joint is on an inside surface of the carton which is typically, subsequently sterilized prior to filling.

There are two general types of known applicators. One type of applicator is a linear applicator. In a linear applicator, closures are picked from a chute and are positioned on an anvil. The anvil supports the closure during transport and subsequent attachment, e.g., sealing to the carton. The closure, positioned on the anvil, is then inserted into an interior region of the carton and is moved into contact with an inside surface of the carton, such that the closure spout protrudes through the pre-punched carton opening. A sealing head, such as an ultrasonic welding head is then brought into contact with an outside surface of the closure over lying or corresponding to the flange. The closure is then sealed to the carton. Subsequently the anvil is pulled back from the closure as the sealing device is pulled back from the carton. The anvil then indexes through various machine operations to "pick" a subsequent closure.

In the linear-type applicator, all of the movements or motions of the machine are linear. That is, the anvil moves in a linear motion (e.g., up and down) to pick the closure, moves in a linear motion to position the closure within the carton and bring the closure into contact with the inside or interior surface thereof. Likewise, the sealing device moves in a linear motion to contact the outside surface of the carton corresponding to the closure flange. Also likewise, the withdrawal or rearward motions of the sealing head and anvil are linear. Exemplary of a linear machine is that disclosed in Giacomelli et al., U.S. Pat. No. 5,819,504, commonly assigned herewith and incorporated herein by reference.

Another type of applicator is a rotary applicator. In a rotary applicator, the closures are typically carried on a star wheel or like spoked device. The closures are carried at about the ends of the star legs or spokes. The wheel rotates into position to receive a closure, and rotates into a subsequent position to position the closure at about the carton entrance. Such a machine may include linear motions to, for example, move the closure into contact with the interior surface of the carton. Other linear motions may include those of the sealing head moving into contact with the outside surface of the carton. Exemplary of a rotary-type machine is that disclosed in Rogalski et al., U.S. Pat. No. 5,964,687.

Although both of these closure applicator types are widely excepted in the art, each has its drawbacks. For example, the linear-type applicator, although sufficiently fast for operating on today's high-speed filling lines, is an inefficient method in which to transport the closures. That is, there is a considerable amount of mechanical movement necessary to move the closure from picking through sealing. Nevertheless, these linear-type applicators do, in fact, function quite well in use.

Rotary applicators, while being efficient in motion, have been found to be limited in use. That is, it has been found that rotary applicators are difficult, at best, to adapt for use in any machine other than a single indexed filling machine. A single indexed filling machine is one in which a single package per filling line is at any given machine cycle. Thus, although the rotary applicator is an efficient mechanical movement, its use is limited to single indexed filling machine lines.

Accordingly, there exists a need for a closure applicator that is of an efficient machine design, that permits concurrently attaching multiple closures to respective cartons, at an applicator attachment station. Desirably, such an applicator utilizes rotary technology to move the closure, subsequent to picking, into the carton interior. Such an applicator uses linear-movement technology to pick the closure and to bring the closure into contact with the carton interior surface. Most desirably, such an application minimizes the number of ports required over the filling lines.

BRIEF SUMMARY OF THE INVENTION

A rotary closure applicator applies two closures contemporaneously to two respective cartons on a form, fill and seal packaging machine. The closures are inserted into openings and secured to the respective cartons.

The applicator includes a body and a rotating shaft having a first longitudinally stationary section and a second longitudinally movable section. The first and second shaft sections are rotatable with one another independent of longitudinal movement of the movable section. Means is provided to longitudinally move the movable shaft section.

Rotating means, currently configured as a drive, is operably connected to one of the shaft sections for rotating the first and second shaft sections together. Preferably, the drive is operably connected to the stationary shaft section. In a current embodiment, the drive is connected to the shaft section by a belt, such as a toothed belt, and the shaft includes a gear or cog engaged by the belt.

Applicator means, currently configured as a spoked applicator member, is operably connected to the longitudinally movable shaft section. In a current embodiment, the applicator member is a star wheel having four spokes or legs. Movement of the longitudinally movable shaft section moves the applicator member toward and away from the cartons.

Closure supporting means, embodied as supporting elements, are mounted to each of the applicator member spokes. In the current embodiment, the star wheel includes four supporting element or anvils for supporting closures thereon. The closure are supported on the anvils for moving the closures into engagement with their respective cartons.

Sealing members are movable into and out of engagement with the cartons with the closures positioned in the carton openings for sealing the closures to the cartons. In a current embodiment, the sealing members are ultrasonic sealing or welding horns. The horns are longitudinally movable toward and away from the closures (and the cartons) to seal the closures to the cartons.

In a current embodiment the second shaft section telescopes relative to the first shaft section for providing longitudinal movement of the second shaft section. A shaft support supports the shaft during longitudinal movement. The shaft support can include a knee-lock linkage for supporting the shaft second section. The knee-lock linkage moves the second shaft section and locks the second shaft section into a first terminal position.

The knee-lock linkage can be actuated by movement of a cylinder shaft, and can include a first linkage member extending from the cylinder shaft to the applicator body and a second linkage member operably connected to the shaft support. Movement of the cylinder shaft moves the linkage to effect longitudinal movement of the second shaft section. In one configuration, in the first terminal position the closures are inserted into the carton openings for sealing thereto.

The applicator can be configured having the sealing horns carried by the applicator body. The sealing horns can also be movable relative to the applicator body. Alternately, the sealing horns can be separate from the applicator body.

The sealing horns can be mounted to the body by a knee-lock linkage support for longitudinally moving the sealing members into and out of engagement with the cartons and closures. The sealing horn knee-lock linkage can be configured to lock the horns into engagement with the containers and the closures.

A closure supply can be provided. In a preferred supply, closures are captured by two of the closure supporting elements (i.e., two outboard elements) when another two elements (two inboard—of the carton—elements, with closures thereon) are moved into engagement with their respective cartons.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 5A–B illustrate front-to-back orientation of the cartons moving through the indexed machine in which FIG. 5A illustrates the relative orientation of the cartons; and FIG. 5B is a side view of the cartons as the closures are being attached thereto;

FIGS. 6A–6B illustrates back-to-back orientation of the cartons moving through the indexed machine in which FIG. 6A illustrates the relative orientation of the cartons; and FIG. 6B is a side view of the cartons as the closures are being attached thereto;

FIG. 7 is a side view of the telescoping shaft and shaft support assembly the permits longitudinal movement of the shaft section; and FIG. 8 is a cross-sectional view taken along line 8—8 in FIG. 7.

DETAILED DESCRIPTION OF THE INVENTION

Figure 1:
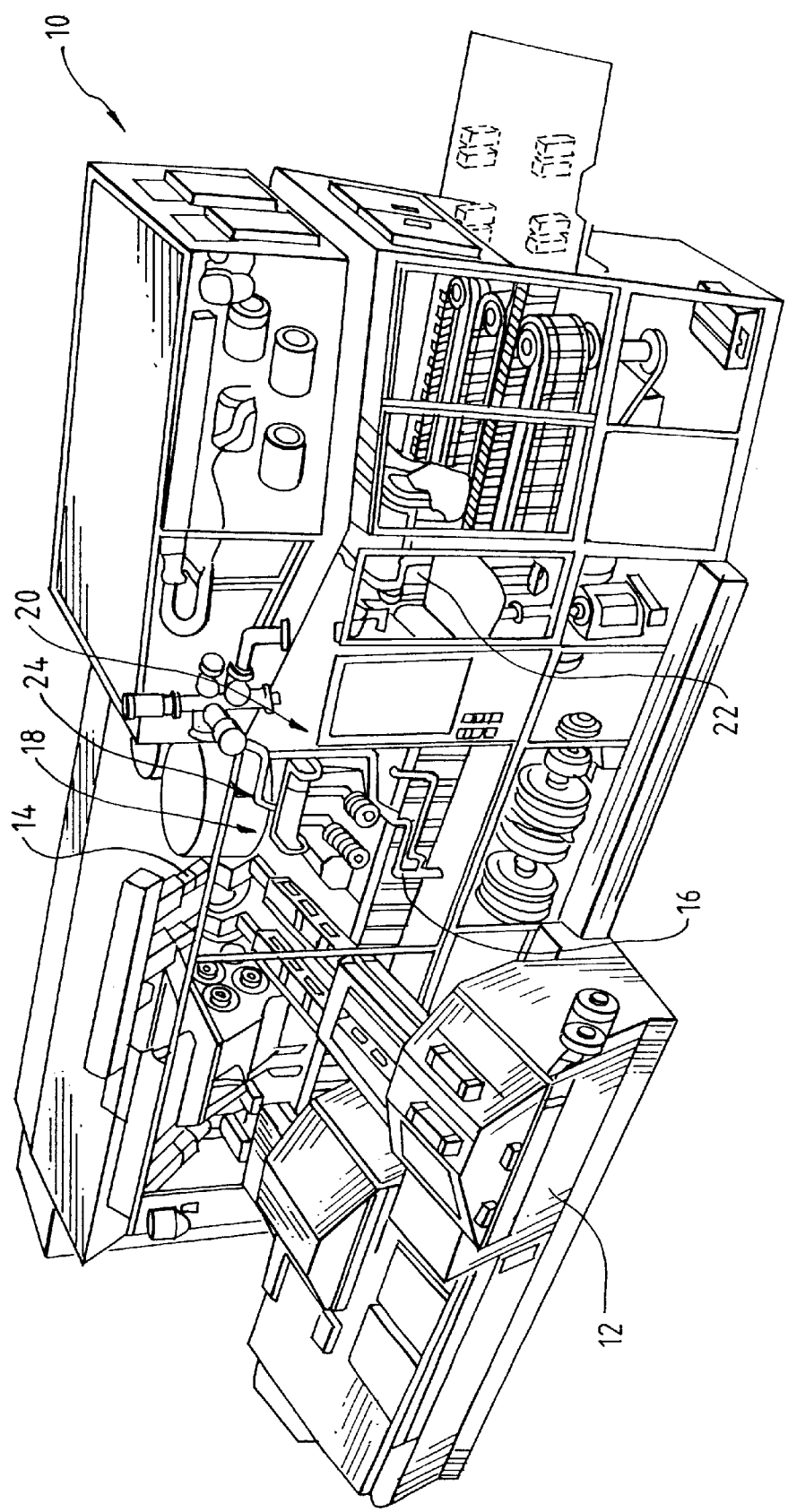
FIG. 1 is a perspective view of a typical form, fill, and seal machine that includes a rotary closure applicator embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood hat the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring now to the figures and in particular FIG. 1, there is shown a conventional form, fill and seal packaging machine 10. In such a machine 10, cartons C are fed into the machine 10 in a flat folded form from a magazine 12. The cartons C are then opened into a tubular form and are fed onto mandrels 14. At the mandrels 14, the bottom flaps of the cartons are folded and sealed to form a sealed bottom B. The semi-erected cartons C (the cartons C with sealed bottoms and opened tops) are then positioned on an indexed conveyor 16. The conveyor 16 transports the cartons C through a plurality of stations. The stations include, at a minimum, a closure applicator station 18, a filling station 20 and a top sealing station 22. Optionally, the machine can include one or more sterilization stations 24 at which the cartons C are sterilized, such as prior to filling.

The formed, filled, and sealed cartons C are then off-loaded for subsequent packaging and distribution. The construction and operation of an exemplary form, fill and seal machine is disclosed in U.S. Pat. No. 6,012,267, which patent is commonly assigned herewith and is incorporated herein by reference.

Figure 2:
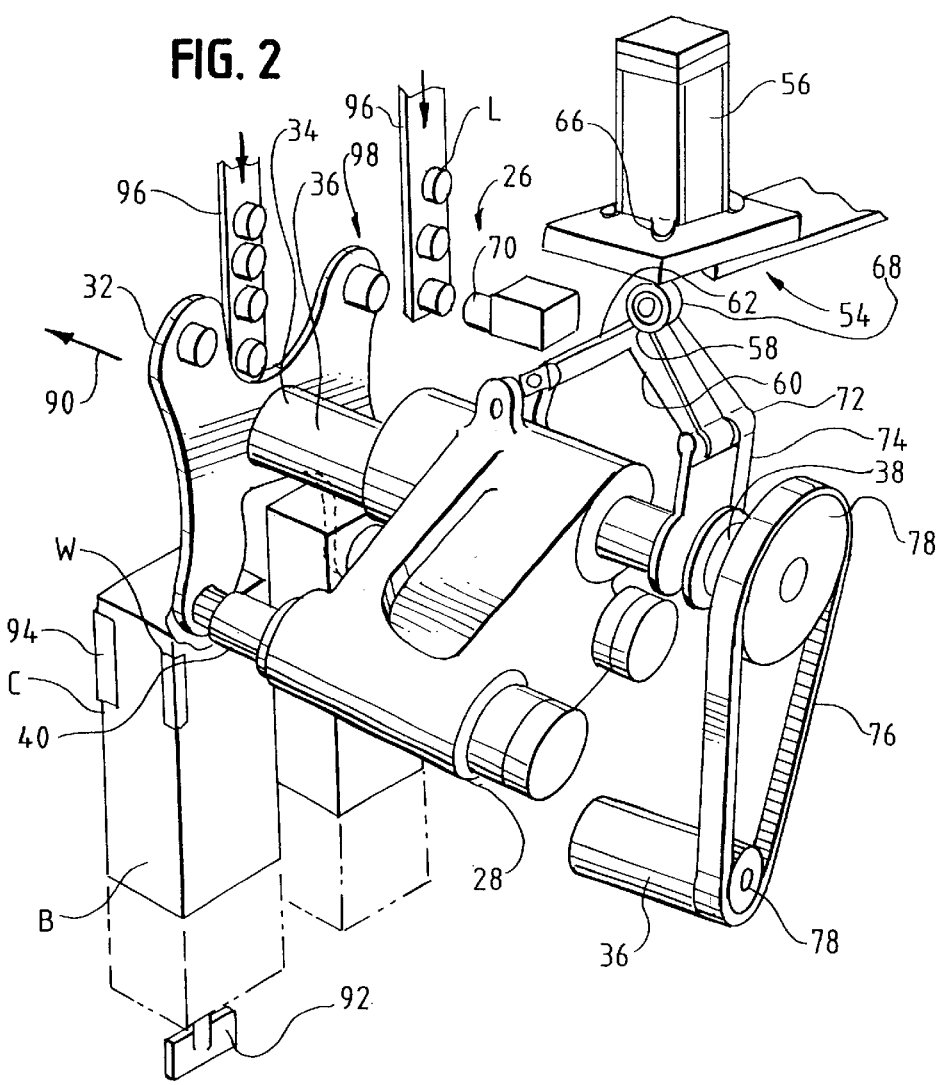
FIG. 2 is a partial perspective view of the rotary closure applicator, the applicator being shown with two cartons in the sealing position in solid lines and further illustrating movement of the cartons toward and away from the applicator in phantom lines.
Figure 3:
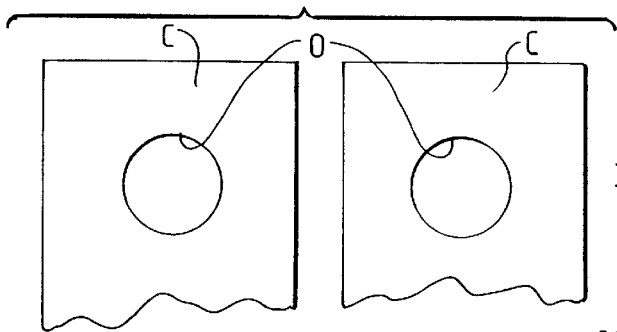
FIG. 3 is an illustration of two cartons positioned in a side-by-side arrangement for closure application.

Referring now to FIG. 2, there is shown a rotary closure applicator 26 embodying the principles of the present invention. The applicator 26 is mounted to the form, fill and seal machine 10 at the applicator station 18. The applicator 26 includes a body 28, a shaft 30, a star wheel 32 mounted to one end 34 of the shaft 30, a drive 36 mounted to the other end 38 of the shaft 30, and a pair of sealing devices 40, exemplary of which are the two illustrated ultrasonic sealing horns 40.

The applicator body 28 is mounted to the machine 10 in a stationary manner. That is, the body 28 remains in fixed position within the machine 10. The shaft 30 includes a first or movable portion 42 that is mounted for reciprocating, e.g., longitudinal movement. A second portion 44 of the shaft 30 is longitudinally stationary (relative to the moveable portion 42). The shaft portions 42, 44, however, rotate together. To this end, the shaft portions 42, 44 can include, for example, a key-lock type of arrangement in which a ridge or projection 46 extends from one of the shaft sections 44 into a channel 48 in the other section 42. In this manner, for example, as the driven section 44 rotates, the longitudinally movable section 42 rotates along with it. The sections 42, 44 can, however, telescope relative to one another to provide the (independent) longitudinally moving function, while maintaining the cooperative rotational functions. Those skilled in the art will recognize that there are numerous other means for contemporaneously or integrally rotating the shaft sections 42, 44 while proving means for independently longitudinally moving one of the shaft sections 42 relative to the other section 44, which other means are within the scope and spirit of the present invention.

The shaft sections 42, 44 join one another at a shaft joint 50. The joint 50 can be configured as a sleeve-type arrangement in which one of the sections (for example, the stationary section 44) has a small diameter than the other (movable) section 42 and is fit therein. In this manner the shaft sections 42, 44 can telescope to provide the longitudinal movement of the section 42. It will b appreciated from a study of the figures in conjunction with the present description that the joint 50 will move as the shaft sections 62, 44 telescope.

The shaft 30 is supported by a support or hanger assembly 52. The support 52 maintains the shaft 30 radially fixed, relative to the applicator body 28, while supporting the longitudinally moving function.

In a current embodiment, the support 52 includes a knee-lock linkage 54 operably connected to a cylinder or like device 56. In such a linkage 54, first ends 58, 60 of first and second link members 62, 64, respectively, are operably connected to one another and to a shaft 66 extending from the cylinder 56. The link members 62, 64 are pivotally mounted to the cylinder shaft 66 at a link joint 68. In this manner, reciprocating movement of the shaft 66 results in reciprocating movement of the link joint 68. This moves the opposing or second ends 70, 72 of the link members 62, 64, respectively, toward and away from one another.

As illustrated, the first link second end 70 is mounted to the applicator body 28. Thus, although this end 70 of the link 62 pivots relative to the body 28, it does not move in a longitudinal manner. To this end, the longitudinal movement is transferred to the second end 72 of the second link 64. This link end 72 is operably connected to the support 52 at the shaft joint 50. This connection can be made by a secondary link 74 as illustrated in FIGS. 2 and 7, or it can be made directly to the joint. All such arrangements and configurations are within the scope and spirit of the present invention. In addition, a secondary link (not shown) can also be provided between the first link second end 70 and the applicator body 28 to provide some accommodation for longitudinal movement of the link second end 70.

In addition, as will be recognized by those skilled in the art, this knee-lock arrangement 54 not only provides for longitudinal movement of the shaft section 42 as described above, but also "locks" this section 42 into this position when, as configured as illustrated in FIG. 2, the shaft section 42 is fully retracted and the links 62, 64 are fully pivoted away from one another (e.g., flat).

The drive 36 is operably connected to the longitudinally stationary shaft section 44. A belt or like member 76 extends between the drive 36 and the shaft 36. The drive 31 and shaft 30 can include, for example, toothed wheels or gears 78, and the belt 76 can likewise be toothed to provide positive, indexed transfer of rotational movement from the drive 36 to the shaft 30. A preferred drive 36 is a servomotor to provide precise rotational control, e.g., stepping, of the motor 36. Alternate arrangements can include friction drives, direct drives and the like, all of which alternate arrangements are within the scope and spirit of the present invention.

The star wheel 32 is mounted to the moveable shaft section 42. Thus, extension and retraction of the cylinder shaft 66 moves the links 62, 64, which in turn longitudinally moves the star wheel 32. Longitudinal movement of the star wheel 32 is between two terminal positions, that is, a fully retracted or engagement position (FIG. 2) and a fully extended position. The illustrated star wheel 34 includes four spokes 80, 82, 84, 86. Each spoke 80–86 includes an anvil 88 that is configured to receive a closure L and to temporarily hold or secure the closure L. The closure is "held" from when it is picked from a chute 96, as the star wheel 32 is rotated and moved into position in the container C. The anvil 88 is, however, configured to release the closure L after the closure L is applied to the carton C.

In a first or engagement position (FIG. 2), the star wheel 32 moves to position a pair of closures L (one each positioned on a respective inboard spoke 80, 82 of the wheel 32) into engagement with the inside walls W their respective cartons or containers C. In this engagement position, the closures L are positioned within the pre-punched holes or openings O and are thus in position for subsequent sealing. In a second or disengaged position, the star wheel 32 is moved away from the container inside walls W (as indicated by the arrow at 90). As described above, when in the engaged position, the knee-lock arrangement 54 locks the star wheel 32, and closures thereon, into engagement with the carton inside walls W, positioned ready for sealing the closures L to their respective containers C.

Although not specifically illustrated, the ultrasonic horns 40 can be mounted to the applicator body 28 using a knee-lock or like arrangement. Alternately, cylinders, such as pneumatic cylinders (similar to cylinder 56) can be used to position the horns 40. In this manner, when the horns 40 are brought into engagement with the outside wall S of the containers C, they can be securely positioned in engagement with containers C for the sealing or welding operation. Those skilled in the art will appreciate the various other arrangements that can be used to position the ultrasonic horns 40 in place for the sealing operation, which other arrangements are within the scope and spirit of the present invention.

In a current embodiment of the applicator 26, the cartons C are lifted from the indexed conveyor 16 up to the star wheel 32 for insertion of the closures L into the carton C. The cartons C can be lifted two at a time and can be lifted by lifts 92 using guides 94 to properly position the cartons C at the star wheel 32 for positioning and sealing the closures L to the cartons C. It has been found that it is advantageous to raise and lower the cartons C to the applicator 26, rather than raising and lowering the applicator to the cartons. Those skilled in the art will recognize that it is more readily carried out to raise and lower the cartons C in that the cartons C are considerably lighter and nevertheless move through the machine 10, than to raise and lower the applicator. In addition, in that the star wheel 32 "picks" closures L from the chute 96 and secures the closures L to the star wheel 32 (as illustrated at 98), at the same time that the closures L are welded to the carton C, it will be again be readily apparent by those skilled in the art that it is more advantageous to raise and lower the cartons C thus facilitating and simplifying machine 10 operation.

In operation, the application steps are carried out as follows:

1. The cartons C (two cartons at time) are lifted. It is to be noted that at this point in time, the star wheel 32 is in the disengaged position with a pair of closures L (one on each of two adjacent star wheel legs 80, 82) positioned on the anvils 88 on the legs 80, 82. It is also to be noted that when in this position, the support cylinder 56 is in the retracted position.

2. The support cylinder 56 is actuated to extend the cylinder shaft 66. This longitudinally moves the shaft 66, and thus moves the star wheel inboard spokes 80, 82 (that is, the spokes with the closures L thereon) into the engaged position. That is, this draws the star wheel 32 toward the applicator body 28 and positions the closures L extending through the carton openings O, with the closure flanges F abutting the inside surface W of the carton C, ready for sealing.

Contemporaneous with positioning the closures L for sealing, two new closures L are picked from the chutes 96 by the outboard star wheel spokes 84, 86. The closures L are engaged by and "secured" to the anvils 88.

3. The sealing horns 40 are moved into position abutting the outside surface S of the cartons C and are actuated. In the exemplary embodiment, the ultrasonic welding horns 40 are moved forward into engagement with the outside surface S of the carton C as and where they correspond to (e.g., overlie) the closure flanges F. The horns are then actuated sealing the closures L to the cartons C.

4. The support cylinder 56 is then actuated to retract the cylinder shaft 66. This returns the star wheel 32 to the disengaged position and at the same time the ultrasonic horns 40 are moved away from the cartons C.

5. The two cartons C are then moved downward back into the conveyor 16 plane and are indexed to the next station.

6. The star wheel 32 is then rotated 180° to reposition the outboard spokes 84, 86 to the inboard position. These are the spokes with the closures L secured thereto. In this position, the closures L are ready for positioning in and attachment to the cartons C (the outboard spokes are rotated 180° so that they are now inboard and the previously inboard spokes are now rotated 180° so that they are now outboard).

7. The cartons C are then lifted to the applicator 26 and the application steps are carried out once again.

Figure 4:
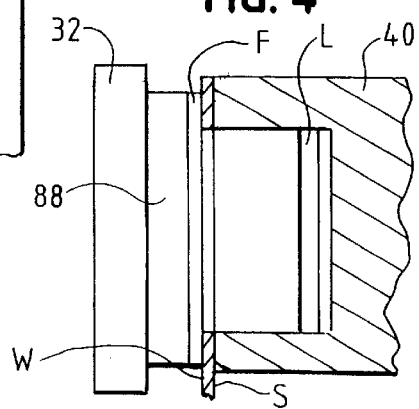
FIG. 4 is cross-sectional view of the carton, with the closure supported on a star wheel inserted through the carton opening and a sealing device brought into contact with the carton for sealing the closure thereto.

FIG. 4 illustrates the alignment of the ultrasonic horn 40 over the closure L that is positioned on the spud or anvil 88 on the star wheel 32, and that is positioned in the carton opening O, at sealing.

Referring now to FIGS. 5A–B, there is shown one orientation in which two parallel lines, as indicated at 98, of cartons C are having closures L attached thereto contemporaneously and in which two cartons C in each line 98 are being fitted with closures L. As it is readily understood from FIGS. 5A–B, the lines 98 are oriented such that they are identical, front-to-back operating lines 98. That is, the lines 98 are identically oriented with one of the carton lines 98 "behind" the other line 98. As will be recognized from the orientation of the applicator bodies 28, 128, in one of the applicators 126, the ultrasonic sealing horns 140 are not formed as part of the applicator body 128. Rather, in order to maintain the applicator bodies 128 of each line 98 away from the center R of the packaging machine 10, one of the applicator bodies 128 is positioned such that the engaged position (of the star wheel 132) is away from, rather than toward the carton C. In this orientation, it is necessary to locate the sealing horns 140 separate from the applicator body 128 to provide proper orientation and location of the closure L.

Referring now to FIGS. 6A–B, it will be readily understood in this machine orientation, two cartons C are having closures L applied thereto at each applicator station and that the two lines 100 are running parallel to one another in a back-to-back orientation. In this orientation, the applicators 26 are disposed essentially in mirror image relation to one another, as will be appreciated from a study and comparison of FIGS. 6A–B and FIGS. 5A–B. This has the advantage of locating the sealing horns 40 within the applicator bodies 28 if it is so desired.

The disclosure of each patent cited herein, whether or not done so specifically, is incorporated herein by reference.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A rotary closure applicator for applying two closures contemporaneously to two respective cartons on a form, fill and seal packaging machine, the closures being inserted into openings and secured to the respective cartons having sealed bottom walls and open tops, the applicator comprising:

a body;

a rotating shaft having a first longitudinally stationary section and a second longitudinally movable-section, the first and second shaft sections being rotatable with one another independent of longitudinal movement of the movable section;

a longitudinal drive for moving the second longitudinally movable shaft section;

a rotating drive operably connected to one of the shaft sections for rotating the shaft;

a spoked applicator member operably connected to the longitudinally movable section for moving the applicator member toward and away from the cartons;

at least four closure supporting elements mounted to the applicator member for supporting closures thereon for moving the closures into engagement with their respective cartons;

longitudinally movable sealing members movable into and out of engagement with the cartons with the closures positioned in the carton openings for sealing the closures to the cartons.

2. The rotary closure applicator in accordance with claim 1 wherein the second shaft section telescopes relative to the first shalt section for providing longitudinal movement of the second shaft section.

3. The rotary closure applicator in accordance with claim 1 including a shaft support for supporting the shaft.

4. The rotary closure applicator in accordance with claim 3 wherein the shaft support includes knee-lock linkage for supporting the shaft second section, for longitudinal moving the second shaft section and for locking the second shaft section into a first terminal position.

5. The rotary closure applicator in accordance with claim 4 wherein the longitudinal drive is operably connected to the knee-lock linkage for moving the movable shaft section between the first terminal position and a second terminal position.

6. The rotary closure applicator in accordance with claim 5 wherein in the first terminal position the closures are inserted into the carton openings for sealing thereto.

7. The rotary closure applicator in accordance with claim 1 wherein the sealing members are carried by the applicator body.

8. The rotary closure applicator in accordance with claim 7 wherein the sealing members are movable relative to the applicator body.

9. The rotary closure applicator in accordance with claim 8 wherein the sealing members are mounted to the body by a knee-lock linkage support for longitudinally moving the sealing members.

10. The rotary closure applicator in accordance with claim 1 wherein the drive is operably connected to the longitudinally stationary shaft section.

11. The rotary closure applicator in accordance with claim 1 including four spokes, each spoke having a closure supporting element at about an end thereof.

12. The rotary closure applicator in accordance with claim 1 including a closure supply wherein closures are captured by tow of the closure supporting elements when another two are moved into engagement with their respective cartons.

13. A rotary closure applicator for applying two closures contemporaneously to two respective cartons on a form, fill and seal packaging machine, the closures being inserted into openings and secured to the respective cartons having sealed bottom walls and open tops, the applicator comprising:
  a body;
  a rotating shaft having a first longitudinally stationary section and a second longitudinally movable section, the first and second shaft sections being rotatable with one another independent of longitudinal movement of the movable section;
  means for rotating the first and second shaft sections;
  means for longitudinally moving the second shaft section;
  applicator means movable toward and away from the cartons;
  closure supporting means mounted to the applicator means for supporting closures thereon; and
  sealing members movable into and out of engagement with the cartons with the closures positioned in the carton openings for sealing the closures to the cartons.

14. The rotary closure applicator in accordance with claim 13 including means for supplying closures to the applicator means.

15. The rotary closure applicator in accordance with claim 13 including locking means associated with the means for longitudinally moving the second shaft section for locking the second shaft section into a first terminal position.

16. The rotary closure applicator in accordance with claim 13 including means for moving the sealing members into and out of engagement with the cartons.

* * * * *